United States Patent [19]
Walker et al.

[11] Patent Number: 5,842,012
[45] Date of Patent: Nov. 24, 1998

[54] EFFICIENT SOFT RESET IN A PERSONAL COMPUTER

[75] Inventors: Gary Walker, Phoenix; David K. Cassetti, Tempe, both of Ariz.; Nicholas J. Richardson, LaJolla, Calif.

[73] Assignee: VLSI Technology, Inc., San Jose, Calif.

[21] Appl. No.: 647,774

[22] Filed: May 15, 1996

[51] Int. Cl.[6] .................................................. G06F 12/02
[52] U.S. Cl. ............................................................. 395/652
[58] Field of Search ............................................. 395/652

[56] References Cited

U.S. PATENT DOCUMENTS 5,301,328  4/1994  Begur et al. ............................ 711/201
5,701,477  12/1997 Chejlava et al. ......................... 395/652

*Primary Examiner*—James P. Trammell
*Assistant Examiner*—John Q. Chavis
*Attorney, Agent, or Firm*—Douglas L. Weller

[57] ABSTRACT

A computer system includes a central processing unit (CPU), system read-only memory (ROM), a random access memory (RAM) and a system controller. The system ROM includes a reset vector. A portion of the RAM is used to shadow the system ROM. The system controller is connected between the CPU, the system ROM and the RAM. The system memory includes an internal memory for storing first data. The system memory also includes logic which, in response to receiving an access to a reset vector stored in the system ROM, returns the first data stored in the internal memory.

10 Claims, 3 Drawing Sheets

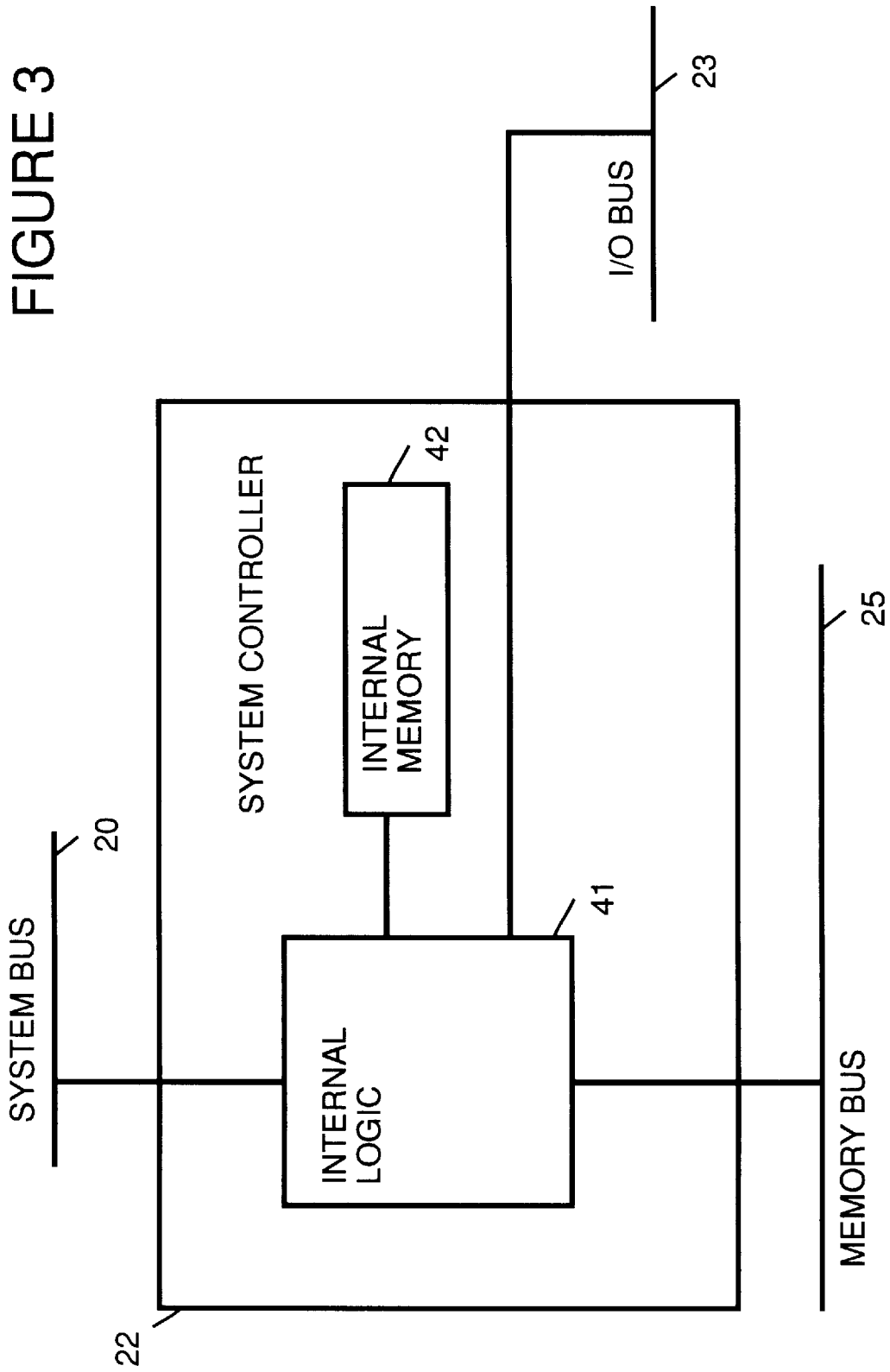

EFFICIENT SOFT RESET IN A PERSONAL COMPUTER

BACKGROUND

This invention relates generally to personal computers and pertains particularly to providing an efficient soft reset.

For many personal computers, a system read only memory (ROM) stores operating system code, including code used to start-up the personal computer. Once the personal computer is started-up, the personal computer accesses both system ROM and dynamic random access memory (DRAM) to perform system operations and execution of application programs.

In many systems, the access time of ROM is significantly slower than the access time of ROM. Therefore, in order to increase performance of the personal computer, after start-up, the personal computer copies the code in the ROM to corresponding locations in DRAM. This is referred to as "shadowing" the ROM. After start-up, the personal computer accesses from the DRAM the code originally in ROM. This allows for faster access to the code originally stored in ROM, and thus enhances performance of the personal computer.

When the computer is reset, a reset vector is the first instruction executed by the central processing unit (CPU). For a personal computer which is compatible with an IBM PC/AT personal computer, the reset vector is located sixteen bytes before the top of memory. For a CPU with a 32-bit address, the reset vector is located at $0\text{fffff0}_h$.

The reset vector is accessed when the system is powered up, and during a system soft reset. During a soft reset, a CPU shutdown cycle occurs. Also, Bit 0 of I/O port $92_h$ is set from a 0 to a 1 and a delay of 6.7 microseconds occurs. Additionally, the data value $F0_h$, $F2_h$, $F4_h$, $F6_h$, $F8_h$, $FA_h$, $FC_h$ or $FE_h$, is written to I/O port $64_h$ followed by a delay of 6.7 microseconds or 50 microseconds. A soft reset was originally the method used to cause CPU to switch from protected mode to real mode.

SUMMARY OF THE INVENTION

In accordance with the preferred embodiment of the present invention, a computer system is presented which includes a central processing unit (CPU), system read-only memory (ROM), a random access memory (RAM) and a system controller. The system ROM includes a reset vector. A portion of the RAM is used to shadow the system ROM. The system controller is connected between the CPU, the system ROM and the RAM. The system memory includes an internal memory for storing first data. The system memory also includes logic which, in response to receiving an access to a reset vector stored in the system ROM, returns the first data stored in the internal memory.

In a first embodiment of the present invention, the first data is equivalent to data stored in the system ROM at a location of the reset vector. In another embodiment of the present invention, the first data is a jump instruction which jumps to a location within random access memory (RAM) where the reset vector in the system ROM is shadowed.

In a third embodiment of the present invention, the first data is equivalent to data stored in a location within the RAM where the reset vector in the system ROM is shadowed. In another embodiment of the invention, the first data is programmable by a user.

The present invention eliminates the need to translate accesses to the reset vector, and thus improves performance of the computing system.

BRIEF DESCRIPTION OF THE DRAWINGS

FIG. 3 shows a simplified block diagram of a system controller for the personal computer shown in FIG. 1 in accordance with the preferred embodiment of the present invention.

DESCRIPTION OF THE PREFERRED EMBODIMENT

Figure 1:
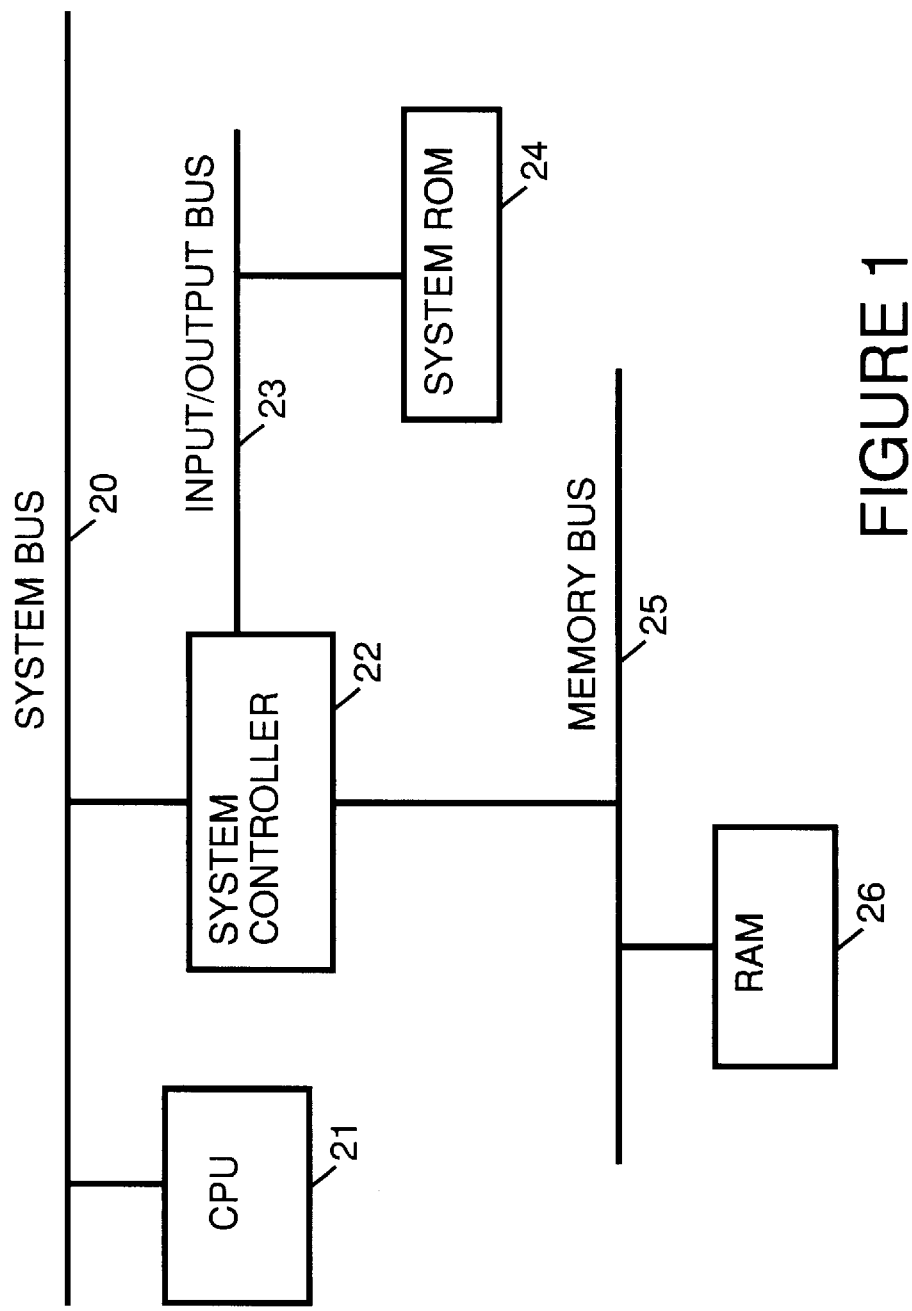
FIG. 1 shows a simplified block diagram of a personal computer in accordance with the preferred embodiment of the present invention.

FIG. 1 shows a simplified block diagram of a personal computer system. A central processing unit (CPU) 21 and a system controller 22 are connected to a system bus 20. For example, CPU 21 is a Pentium processor available from Intel Corporation, having a business address of 2200 Mission College Boulevard, Santa Clara, Calif. 95050. When memory locations are accessed by CPU 21, system controller 22 accesses the memory locations, for example over a memory bus 25 or an input/output (I/O) bus 23. Attached to memory bus 25 is random access memory (RAM) 26. For example RAM 26 is composed of dynamic RAM (DRAM).

I/O bus 23 operates, for example, as a Peripheral Component Interconnect (PCI) bus. Alternately, I/O bus 23 may operate as some other commonly used bus, such as an Industry Standard Architecture (ISA) bus or a SCSI bus. A system read-only memory (ROM) 24 is directly connected to I/O bus 23. Alternately, System ROM 24 is connected to I/O bus 23 through another bus, such as a serial bus. The serial bus is, for example, connected to I/O bus 23 through a bridge and/or through another bus or buses.

For example, in one embodiment of the present invention, a keyboard microcontroller for the computer system and the system ROM are physically located in different parts of the same shared ROM. In this embodiment, when the computer system is powered on, the keyboard microcontroller is in reset and CPU 21 has exclusive access to the shared ROM. Once CPU 21 shadows the system ROM 24 portion of the shared ROM into RAM 26, the keyboard controller is taken out of reset mode, and then has exclusive access to the shared ROM. When a soft reset occurs, to avoid disturbing the keyboard controller, the access to the reset vector is translated by system controller 22 to the location in RAM 26 where the reset vector is shadowed. This however, requires additional gates in the path from CPU 21 to access of RAM 26. An alternate way to handle the soft reset is set out below.

Figure 2:
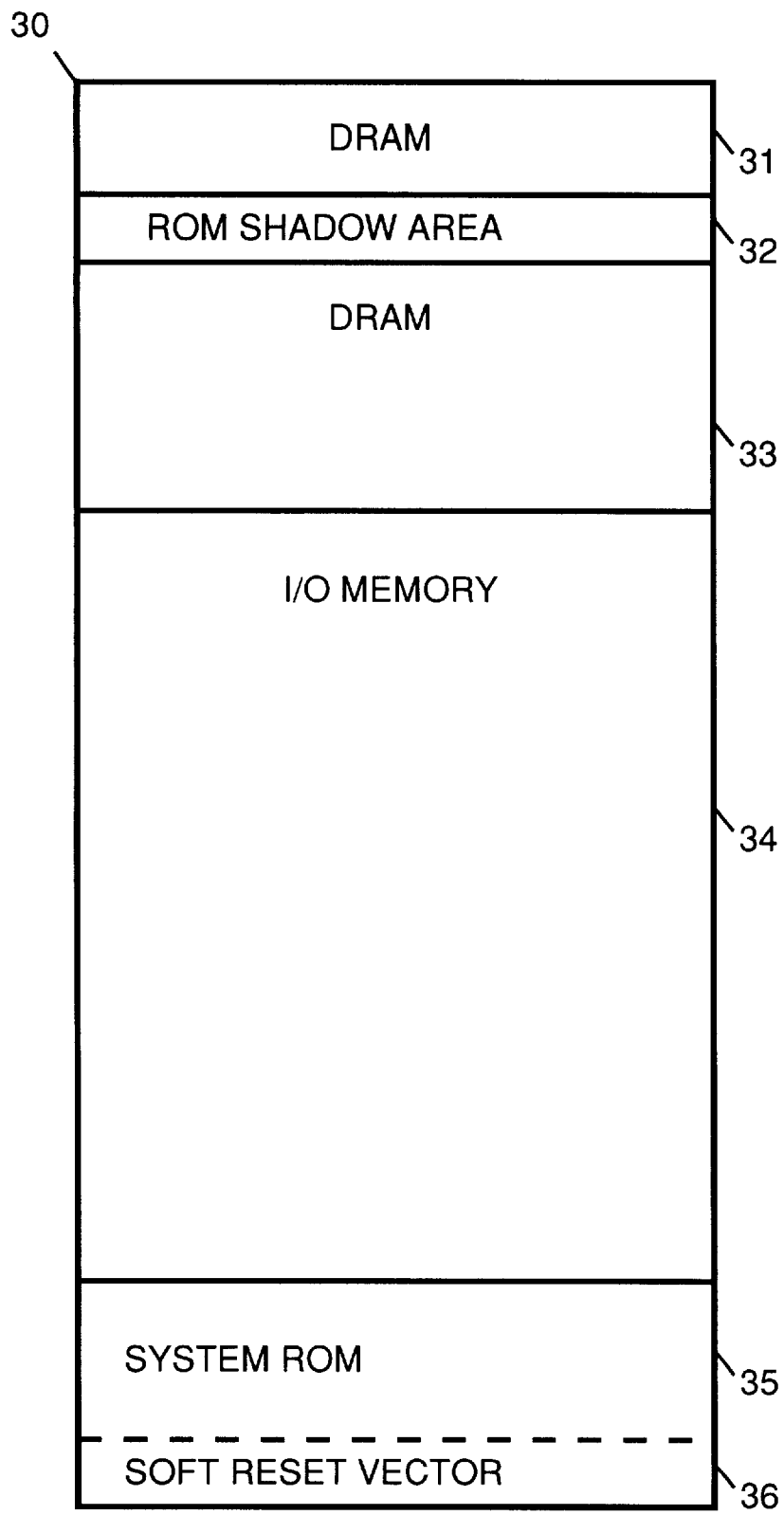
FIG. 2 shows a simplified block diagram of a memory map for the personal computer shown in FIG. 1 in accordance with the preferred embodiment of the present invention.

A memory map 30 for computing system is shown in FIG. 2. A first 640K byte portion 31 of memory address space is dedicated for DRAM use. A next 360K byte portion 32 of the memory address space is dedicated for shadowing system ROM 24. A next portion 33 of the memory address space is used for the remaining DRAM installed in the computing system. A next portion 34 of the memory address space is used to address locations over I/O bus 23. At the top of the memory address space, a 360K byte portion 35 is used to address system ROM 24. A top sixteen bytes 36 of 360K byte portion 35 is used to store the reset vector. When CPU 21 uses a 32-bit address, the software reset vector is located at address $0\text{fffff0}_h$.

As discussed above, when a soft reset occurs, the access to the reset vector may be translated from address $0\text{fffff0}_h$ to the address ($0fffff0_h$) where the reset vector in system ROM 24 is shadowed in 360K byte portion 32 of the memory address space. In order to do this, however, logic within system controller 22 is necessary to watch for an access to $0ffffff0_h$ in order to translate this access to address $0fffff0_h$. These added logic required to perform the address translation can slow down system performance.

In order to increase performance, system controller 22 internally provides the data for all reset vector accesses. This eliminates the requirement to translate the CPU address.

FIG. 3 shows system controller 22 implemented to allow system controller 22 to internally provide the data for all reset vector accesses. Internal logic 41 within system controller 22 is used to access data from memory bus 25 and I/O bus 23. For accesses to the software reset vector (at address $0ffffff0_h$) internal logic 41 accesses internal memory 42 of system controller 22. The data returned from internal memory 42 depends on the particular implementation of the present invention.

For example, typically, the reset vector in system ROM 24 typically contains a far jump to address $0fe05b_h$. Therefore, when internal logic 41 accesses internal memory 42 of system controller 22 in response to a soft reset, internal logic 41 returns a far jump to address $0fe05b_h$.

In an alternative embodiment of the present invention, when internal logic 41 accesses internal memory 42 of system controller 22 in response to a soft reset, internal logic 41 returns a far jump to address $0fffff0_h$. This is the location in the 360K byte portion 32 of the memory address space where the reset vector is shadowed. Thus, in this embodiment, a jump is made to a location in RAM 26 where the reset vector is shadowed.

In another alternative embodiment of the present invention, the data at address $0fffff0_h$ (the location in the 360K byte portion 32 of the memory address space where the reset vector is shadowed) is shadowed within internal logic 41. When internal logic 41 accesses internal memory 42 of system controller 22 in response to a soft reset, internal logic 41 returns the shadowed data. In another alternative embodiment of the present invention, the data returned when internal logic 41 accesses internal memory 42 of system controller 22 in response to a soft reset is programmable. That is, when internal logic 41 accesses internal memory 42 of system controller 22 in response to a soft reset, internal logic 41 returns data which has been pre-programmed to be returned in response to a soft reset.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

We claim:

1. A computer system comprising:

a central processing unit (CPU);

system read-only memory (ROM), the system ROM including a reset vector;

random access memory (RAM), a portion of the RAM being used to shadow the system ROM; and, a system controller coupled between the CPU, the system ROM and the RAM, the system memory including:
an internal memory for storing first data, and
logic means for in response to receiving an access to a reset vector stored in the system ROM, returning the first data stored in the internal memory.

2. A computer system as in claim 1, wherein the first data is equivalent to data stored in the system ROM at a location of the reset vector.

3. A computer system as in claim 1 wherein the first data is a jump instruction which jumps to a location within the RAM where the reset vector in the system ROM is shadowed.

4. A computer system as in claim 1 wherein the first data is equivalent to data stored in a location within the RAM where the reset vector in the system ROM is shadowed.

5. A computer system as in claim 1 wherein the first data is programmable by a user.

6. A method for responding to a soft reset in a computing system comprising the following steps:

(a) receiving, by a system controller, an access to a reset vector stored in a system read-only memory (ROM); and, (b) returning, by the system controller, data stored internally within the system controller.

7. A method as in claim 6 wherein in step (b), the data returned is equivalent to data stored in the system ROM at a location of the reset vector.

8. A method as in claim 6 wherein in step (b), the data returned is a jump instruction which jumps to a location within random access memory (RAM) where the reset vector in the system ROM is shadowed.

9. A method as in claim 6 wherein in step (b), the data returned is equivalent to data stored in a location within random access memory (RAM) where the reset vector in the system ROM is shadowed.

10. A method as in claim 6 wherein in step (b), the data returned is data pre-programmed by a user.

* * * * *